United States Patent
Manakkal et al.

(10) Patent No.: US 7,852,909 B2
(45) Date of Patent: Dec. 14, 2010

(54) METHOD AND APPARATUS FOR ESTIMATING FREQUENCY OFFSET AND TIMING OFFSET OF ONE OR MORE MOBILE STATIONS (MSS)

(75) Inventors: Rajesh Raja Manakkal, Santa Clara, CA (US); Louay Jalloul, Santa Clara, CA (US); Sam P. Alex, Santa Clara, CA (US); Anupama Lakshmanan, Santa Clara, CA (US); Djordje Tujkovic, Santa Clara, CA (US); Sriram Mudulodu, Santa Clara, CA (US)

(73) Assignee: BECEEM Communications Inc., Santa Clara, CA (US)

( * ) Notice: Subject to any disclaimer, the term of this patent is extended or adjusted under 35 U.S.C. 154(b) by 604 days.

(21) Appl. No.: 12/004,570

(22) Filed: Dec. 21, 2007

(65) Prior Publication Data

US 2008/0273621 A1    Nov. 6, 2008

Related U.S. Application Data

(60) Provisional application No. 60/927,684, filed on May 4, 2007.

(51) Int. Cl.
*H04B 1/38* (2006.01)

(52) U.S. Cl. .................... 375/219; 375/260

(58) Field of Classification Search ......... 375/219–222, 375/260
See application file for complete search history.

(56) References Cited

U.S. PATENT DOCUMENTS

| | | | |
|---|---|---|---|
| 6,778,130 B1 * | 8/2004 | Bevan et al. | 342/174 |
| 2002/0119796 A1 * | 8/2002 | Vanghi | 455/522 |
| 2003/0081562 A1 * | 5/2003 | Iwamatsu et al. | 370/314 |

* cited by examiner

*Primary Examiner*—Emmanuel Bayard

(57) ABSTRACT

A method and apparatus for estimating frequency offset and timing offset of a first Mobile Station (MS) in a communication system is provided. The method includes receiving a composite signal at a plurality of receiver antennas of a Base Transceiver Station (BTS). The composite signal includes a first signal transmitted from a first MS and a second signal transmitted from a second MS. The composite signal includes one or more tiles. Each tile includes a plurality of data sub-carriers, a plurality of first pilot sub-carriers, and a plurality of second pilot sub-carriers. A total phase offset of the first MS is estimated based on a complex conjugate product of pilot symbols of the plurality of first pilot sub-carriers. Thereafter, a first phase offset corresponding to the timing offset of the first MS is estimated based on a Power Delay Profile (PDP) of one or more first pilot sub-carriers. Finally, a second phase offset corresponding to the frequency offset of the first MS is determined based on the total phase offset and the first phase offset.

24 Claims, 7 Drawing Sheets ns. More specifically, the present invention relates to a
METHOD AND APPARATUS FOR ESTIMATING FREQUENCY OFFSET AND TIMING OFFSET OF ONE OR MORE MOBILE STATIONS (MSS)

CROSS-REFERENCE TO RELATED APPLICATION

This application claims the benefit of U.S. Provisional Application Patent Application No. 60/927,684 filed on May 4, 2007, which is incorporated by reference in its entirety herein.

BACKGROUND

The present invention generally relates to communication systems. More specifically, the present invention relates to a method and apparatus for estimating frequency offset and timing offset in a communication system.

In a collaborative communication system, two Mobile stations (MSs) each having a transmit antenna can transmit signals to a Base Transceiver Station (BTS) on the same channel. Such a transmission is collaborative, since the signals transmitted from each of the transmit antennas of the two MSs, are spatially multiplexed through the utilization of the same tiles. The signal includes a plurality of tiles. In the collaborative Uplink (UL), Partial Usage of Sub-Carrier (PUSC) tile structure includes three Orthogonal Frequency Division Multiplexing (OFDM) symbols and four frequency sub-carriers according to IEEE 802.16e standard. Data sub-carriers of each of the two MSs are superimposed and pilot sub-carriers of each of the two MSs are placed on opposing corners of the tile, i.e. pilot symbols from each user are orthogonally allocated.

While transmitting the signal from each MS to the BTS a timing offset may occur between each MS and the BTS. A timing offset occurs due mismatch between a clock at a transmitter of a MS and a clock at a BTS. Similarly, a frequency offset may occur between each MS and the BTS due to a Doppler and a local oscillator mismatch between the MS and BTS. Additionally, timing offsets and frequency offsets may occur due to temperature changes, aging and other factors.

Timing offset and frequency offset manifest in channel estimation errors, thereby inducing a loss in Signal-to-Noise Ratio (SNR) and can lead to Inter-Carrier Interference (ICI). A significant loss in SNR and the presence of ICI contribute to degradation in the link performance.

SUMMARY

An embodiment provides a method and apparatus for estimating frequency offset and timing offset of one or more Mobile Stations (MS) in a communication system.

Another embodiment provides a method and apparatus for estimating a channel of one or more MSs in a communication system in the presence of timing offset and frequency offset in a collaborative spatial multiplexing Orthogonal Frequency Division Multiplexing (OFDM) system.

Embodiments listed below include a method and apparatus for estimating frequency offset and timing offset of a first MS in a communication system. The method includes receiving a composite signal at a Base Transceiver Station (BTS) using one or more receiver antennas. The composite signal includes a first signal of a first MS and a second signal of a second MS in one or more tiles. Each tile includes a plurality of data sub-carriers, a plurality of first pilot sub-carriers and a plurality of second pilot sub-carriers. A total phase offset of the first MS is estimated based on a complex conjugate product of pilot symbols of the plurality of first pilot sub-carriers. Thereafter, a first phase offset corresponding to the timing offset of the first MS is estimated based on a Power Delay Profile (PDP) determined using one or more first pilot sub-carriers. A second phase offset corresponding to the frequency offset of the first MS is estimated based on the total phase offset and the first phase offset.

BRIEF DESCRIPTION OF DRAWINGS

A more complete appreciation of the present invention is provided by reference to the following detailed description when considered in conjunction with the accompanying drawings in which reference symbols indicate the same or similar components, wherein.

DETAILED DESCRIPTION OF THE DRAWINGS

Various embodiments described herein provide method and apparatus for estimating frequency offset and timing offset of one or more Mobile Stations (MSs) in a communication system. A Base Transceiver Station (BTS) receives a composite signal through one or more receiver antennas of the BTS. The composite signal includes a first signal from a first MS and a second signal from a second MS in one or more tiles. Each tile includes a plurality of data sub-carriers, a plurality of first pilot sub-carriers and a plurality of second pilot sub-carriers. A total phase offset of the first MS is estimated based on a complex conjugate product of pilot symbols of the plurality of first pilot sub-carriers. Thereafter, a first phase offset corresponding to the timing offset of the first MS is estimated based on a Power Delay Profile (PDP) determined using one or more first pilot sub-carriers. Finally, a second phase offset corresponding to the frequency offset of the first MS is determined based on the total phase offset and the first phase offset.

Figure 1:
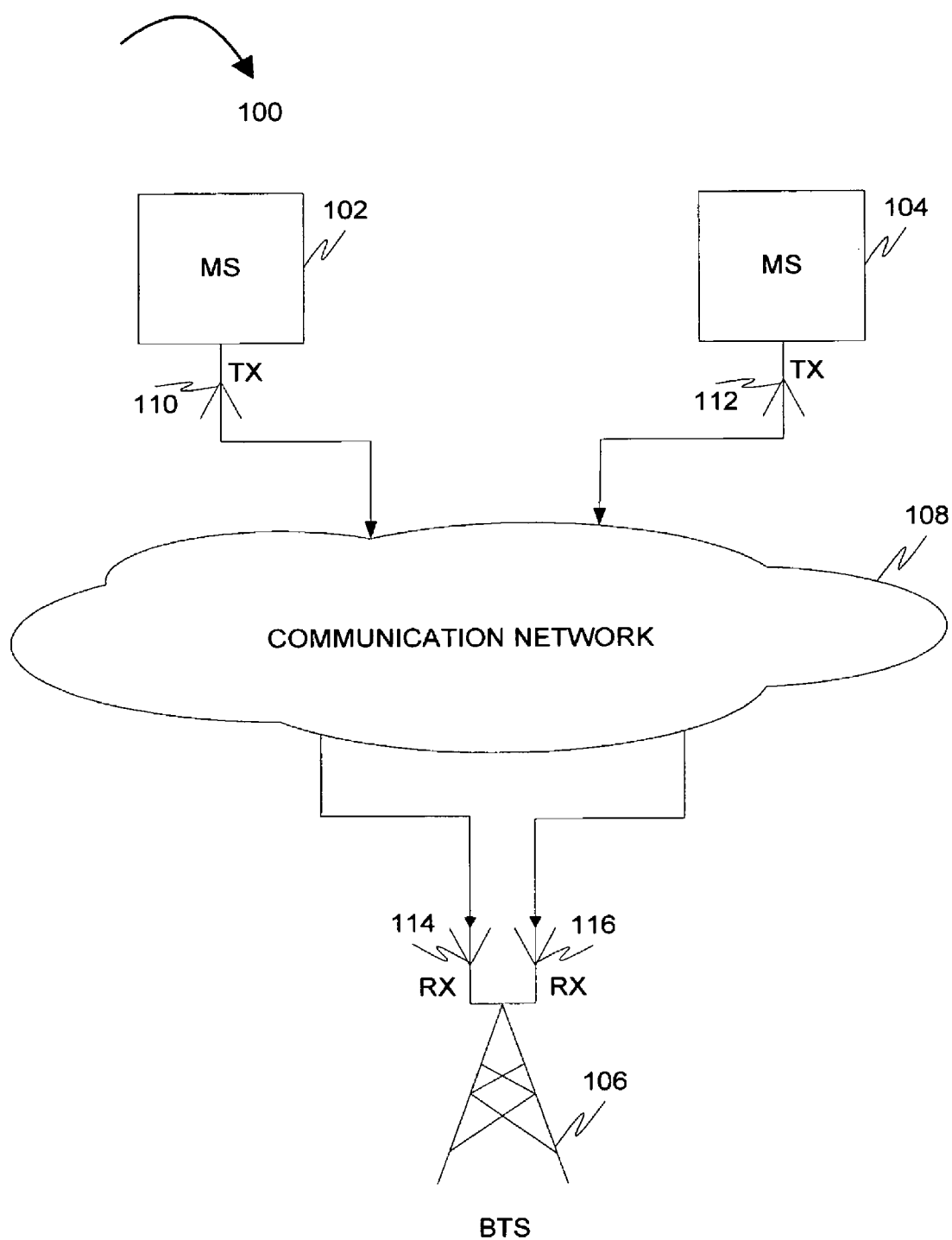
FIG. 1 is a block diagram showing a communication system (that is exemplary) in which various embodiments of the invention may function.

FIG. 1 is a block diagram showing a communication system 100 (that is exemplary) in which various embodiments of the invention may function. Communication system 100 includes a first MS 102, a second MS 104, and a Base Transceiver Station (BTS) 106. It will be apparent to a person skilled in the art that communication system 100 may include more than two MSs. First MS 102 and second MS 104 may communicate with BTS 106 through a communication network 108 and may accordingly transmit signal to BTS 106. The transmission of the signal may be compliant with IEEE 802.16e. The communication of first MS 102 and second MS 104 with BTS 106 may be a collaborative communication. Examples of communication network 108 may include but are not limited to Orthogonal Frequency Division Multiplexing (OFDM) communication network, Orthogonal Frequency Division Multiple Access (OFDMA) communication network.

First MS 102 uses transmit antenna 110 for transmitting a first signal to BTS 106 through communication network 108. Second MS 104 uses transmit antenna 112 to transmit a second signal to BTS 106 through communication network 108. The signals transmitted from first MS 102 and second MS 104 may be compliant with IEEE 108.16e Collaborative Spatial Multiplexing (CSM). BTS 106 receives a composite signal. The composite signal includes the signals transmitted from transmit antenna 110 and transmit antenna 112 through one or more receiver antennas (for example, a receiver antenna 114 and a receiver antenna 116). The composite signal includes one or more tiles. The structure of a tile in the composite signal may be compliant with IEEE 108.16e CSM. This is further explained in detail in conjunction with FIG. 2.

Figure 2:
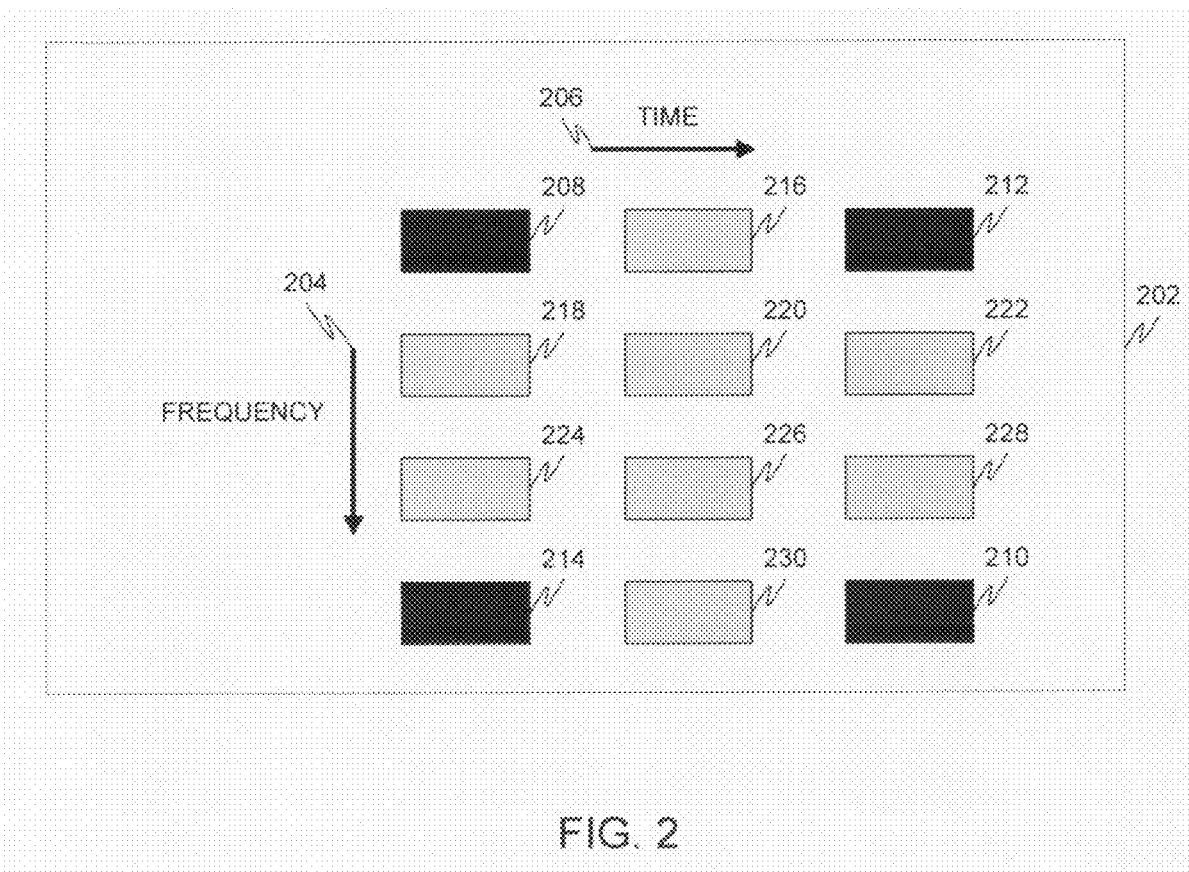
FIG. 2 is a block diagram showing a structure of a tile compliant with IEEE 108.16e collaborative communication system.

FIG. 2 is a block diagram showing the structure of a tile 202 compliant with IEEE 802.16e CSM. Tile 202 includes four consecutive sub-carriers along the frequency dimension indicated by 204 and three consecutive time symbols along the time dimension indicated by 206. A sub-carrier in tile 202 may be one of a pilot sub-carrier and a data sub-carrier. In tile 202, two first pilot sub-carriers of first MS 102 are positioned at 208, which corresponds to the first sub-carrier and the first time symbol in tile 202, and at 210, which corresponds to the fourth sub-carrier and the third time symbol in tile 202. The signal received at 208, which is a pilot sub-carrier position of first MS 102, may be represented as Y (1, 1) and the signal received at 210, which is another pilot sub-carrier position of first MS 102, is represented as Y (4, 3).

Additionally, two second pilot sub-carriers of second MS 104 are positioned at 212, which corresponds to the first sub-carrier and the third time symbol in tile 202, and at 214, which corresponds to the fourth sub-carrier and the first time symbol in tile 202. The signal received at 212, which is a pilot sub-carrier position of second MS 104, may be represented as Y (1, 3) and the signal received at 214, which is another pilot sub-carrier position of second MS 104, is represented as Y (4, 1). Further, a plurality of data sub-carriers of first MS 102 and second MS 104 are superimposed at positions 216, 218, 220, 222, 224, 226, 228, and 230 in tile 202.

Figure 3:
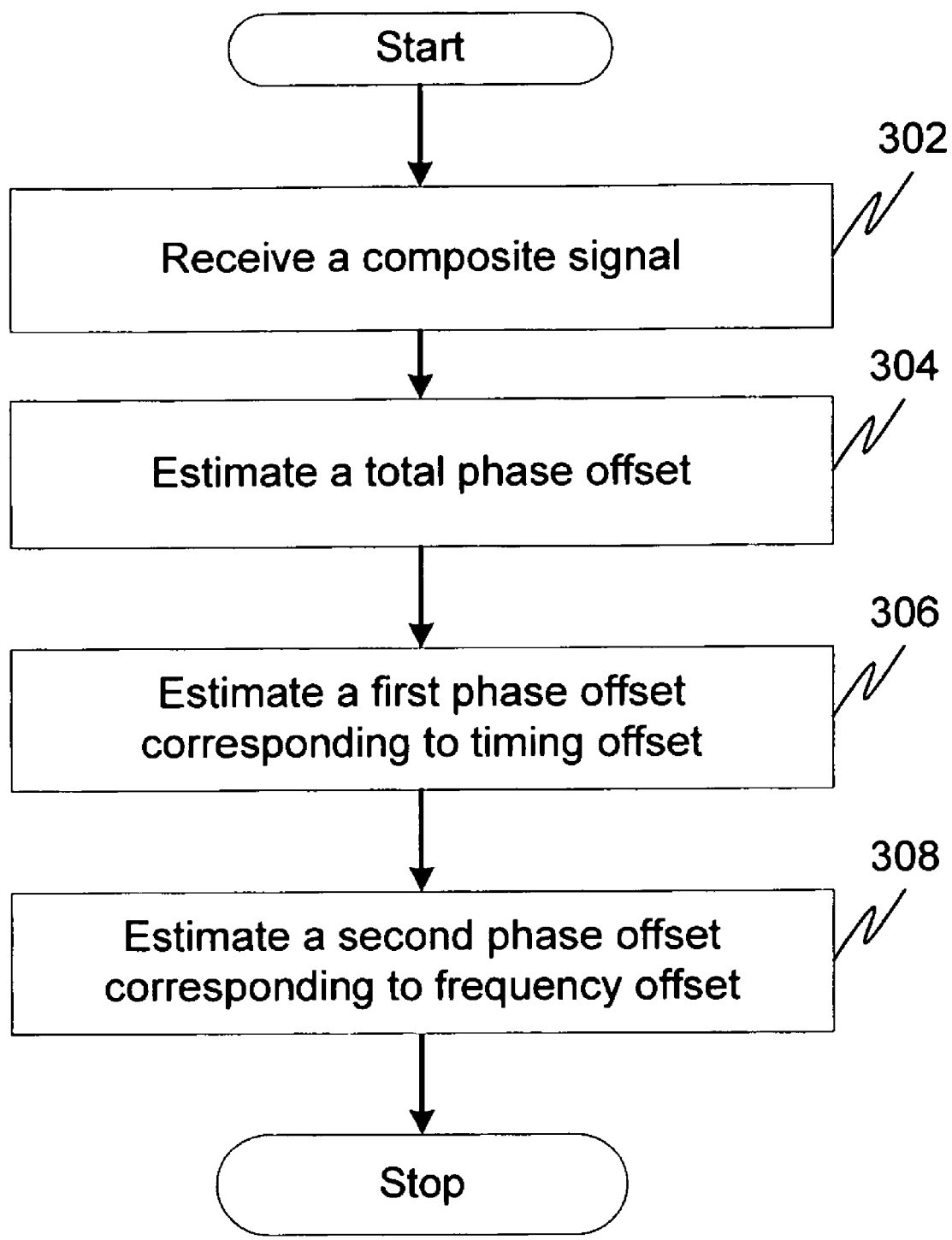
FIG. 3 is a flowchart for estimating frequency offset and timing offset of a first Mobile Station (MS) and a second MS in a communication system, in accordance with an embodiment.

FIG. 3 is a flowchart for estimating frequency offset and timing offset of first MS 102 and second MS 104 in communication system 100, in accordance with an embodiment. At 302, a composite signal, which includes a first signal of first MS 102 transmitted from transmit antenna 110 and a second signal of second MS 104 transmitted from transmit antenna 112, is received through one or more receiver antennas. The composite signal includes one or more tiles. The structure of a tile has been already explained in conjunction with FIG. 2. Each tile includes a plurality of data sub-carriers. The plurality of data sub-carriers correspond to first MS 102 and second MS 104. Data sub-carriers related to each of first MS 102 and second MS 104 may be superimposed in a tile. Each tile further includes a plurality of first pilot sub-carriers for first MS 102 and a plurality of second pilot sub-carriers for second MS 104. In an exemplary embodiment, a tile includes two first pilot sub-carriers for first MS 102 and two second pilot sub-carriers for second MS 104.

At BTS 106, a Fast Fourier Transformation (FFT) is performed on the composite signal received. The output of the FFT at the pilot sub-carrier location corresponding to a MS at a receiver antenna of BTS 106 may be represented by equation (1) given below:

$$Y_{i,p}(k,l) = \exp[j(\theta_t(k)+\theta_f(l))]H_{i,p}(k,l)X_p(k,l)+U_{i,p}(k,l) \quad (1)$$

where, $Y_{i,p}(k,l)$ is the signal at $i^{th}$ receiver antenna of BTS 106, over the $k^{th}$ pilot sub-carrier and $l^{th}$ OFDM time symbol corresponding to the MS in $p^{th}$ tile of the signal after the FFT output signal is de-Pseudorandom Binary Sequence (PRBSed) with the corresponding PRBS at the receiver antenna of BTS 106;

$H_{i,p}(k,l)$ is a frequency response of the channel in the $k^{th}$ pilot sub-carrier, $l^{th}$ OFDM time symbol and $i^{th}$ receiver antenna and in $p^{th}$ tile of the signal;

$X_p(k,l)$ is a pilot symbol in the $k^{th}$ pilot sub-carrier and $l^{th}$ OFDM time symbol in $p^{th}$ tile of the signal, which is boosted in power relative to the data sub-carriers; and $U_{i,p}(k,l)$ is a noise plus interference in the $k^{th}$ pilot sub-carrier, $l^{th}$ OFDM time symbol and $i^{th}$ receiver antenna in $p^{th}$ tile of the signal.

Further, referring to equation 1, $$\theta_t(k) = -2\pi \frac{k}{N}\Delta\tau$$

$$\theta_f(l) = 2\pi l\varepsilon; \varepsilon = \frac{\Delta f}{(W/N)}$$

where, $\theta_t(k)$ denotes a phase in the signal for the MS across the frequency dimension;

$\theta_f(l)$ denotes a phase in the signal for the MS across the time dimension;

$\varepsilon$ is a normalized frequency offset pertaining to a Doppler frequency, which arises due to the motion of the MS, and a local oscillator mismatch between a clock of the MS and BTS 106;

$\Delta\tau$ is a timing offset related to the signal for the MS;

$\Delta f$ is a frequency offset related to the signal for the MS;

W is a bandwidth of the channel related to the MS; and

N is the size of the FFT applied to the signal.

Thereafter, a complex conjugate product of pilot symbols of the plurality of first pilot sub-carriers is computed. In an exemplary embodiment, a complex conjugate product of pilot symbols of a plurality of pilot sub-carriers for a MS may be computed using equation (2) given below:

$$\sum_{i=1}^{N_r}\sum_{p=1}^{P}[Y_{i,p}^*(k,l)Y_{i,p}(k+u,l+v)] \quad (2)$$

where,
u represents the offset in the frequency dimension; and
v represents the offset in the time dimension.

$N_r$ represents the number of receiver antennas in the BTS 106.

P represents the number of tiles over which the complex conjugate product is computed At 304, a total phase offset of first MS 102 is estimated based on the complex conjugate product computed for first MS 102. To estimate the total phase offset of first MS 102, the complex conjugate products of pilot symbols of the plurality of first pilot sub-carriers may be summed over multiple receiver antennas (for example, over each of receiver antenna 114 and receiver antenna 116 of BTS 106 and over a plurality of tiles. Similarly, a second MS total phase offset of second MS 104 is estimated based on a complex conjugate product of pilot symbols of the plurality of second pilot sub-carriers. In an exemplary embodiment, a total phase offset of a MS is computed using equation (3) given below:

$$\theta_{est} = \arg\left\{\sum_{i=1}^{N_r}\sum_{p=1}^{P}[Y_{i,p}^*(k,l)Y_{i,p}(k+u,l+v)]\right\} \quad (3)$$

where, $\theta_{est}$ is the total phase offset from the $k^{th}$ pilot sub-carrier and $l^{th}$ OFDM time symbol of the to $(k+u)^{th}$ pilot sub-carrier and $(l+v)^{th}$ OFDM time symbol of the signal transmitted from the MS;

$N_r$ is the number of receiver antennas at BTS 106; and

P is the number of tiles over which the complex conjugate product is computed.

Thereafter, an impulse response calculated using one or more first pilot sub-carriers is used to estimate a Power Delay Profile (PDP) corresponding to first MS 102. Similarly, an impulse response calculated using one or more second pilot sub-carriers is used to estimate a PDP corresponding to second MS 104. This is further explained in detail in conjunction with FIG. 4.

At 306, a first phase offset corresponding to the timing offset of first MS 102 is estimated based on the PDP of one or more first pilot sub-carriers. Similarly, a second MS first phase offset corresponding to the timing offset of second MS 104 is estimated based on the PDP of one or more second pilot sub-carriers.

Thereafter, at 308, a second phase offset corresponding to the frequency offset of first MS 102 is estimated based on the total phase offset of first MS 102 and the first phase offset of first MS 102. The second phase offset corresponding to the frequency offset may be estimated by calculating the difference between the first phase offset and the total phase offset. Similarly, a second MS second phase offset corresponding to the frequency offset of second MS 104 is estimated based on the second MS total phase offset and the second MS first phase offset. In an embodiment, the second MS second phase offset is estimated by calculating the difference between the second MS first phase offset and the second MS total phase offset. The frequency offset for the first signal received from first MS 102 may be computed by using the equation (4a) given below:

$$\theta_{est,f} = \theta_{est} - \theta_{est,t} \quad (4a)$$

Similarly, the frequency offset for the second signal received from second MS 104 may be computed using the equation (4b) given below:

$$\theta_{est,f} = \theta_{est,t} - \theta_{est} \quad (4b)$$

where, $\theta_{est,t}$ is the timing offset in the signal received at the plurality of receiver antennas of BTS 106 from a MS;

$\theta_{est,f}$ is the frequency offset in the signal received at the plurality of receiver antennas of BTS 106 from a MS; and $\theta_{est}$ is the total phase offset in the signal received at the plurality of receiver antennas of BTS 106 from a MS.

Figure 4:
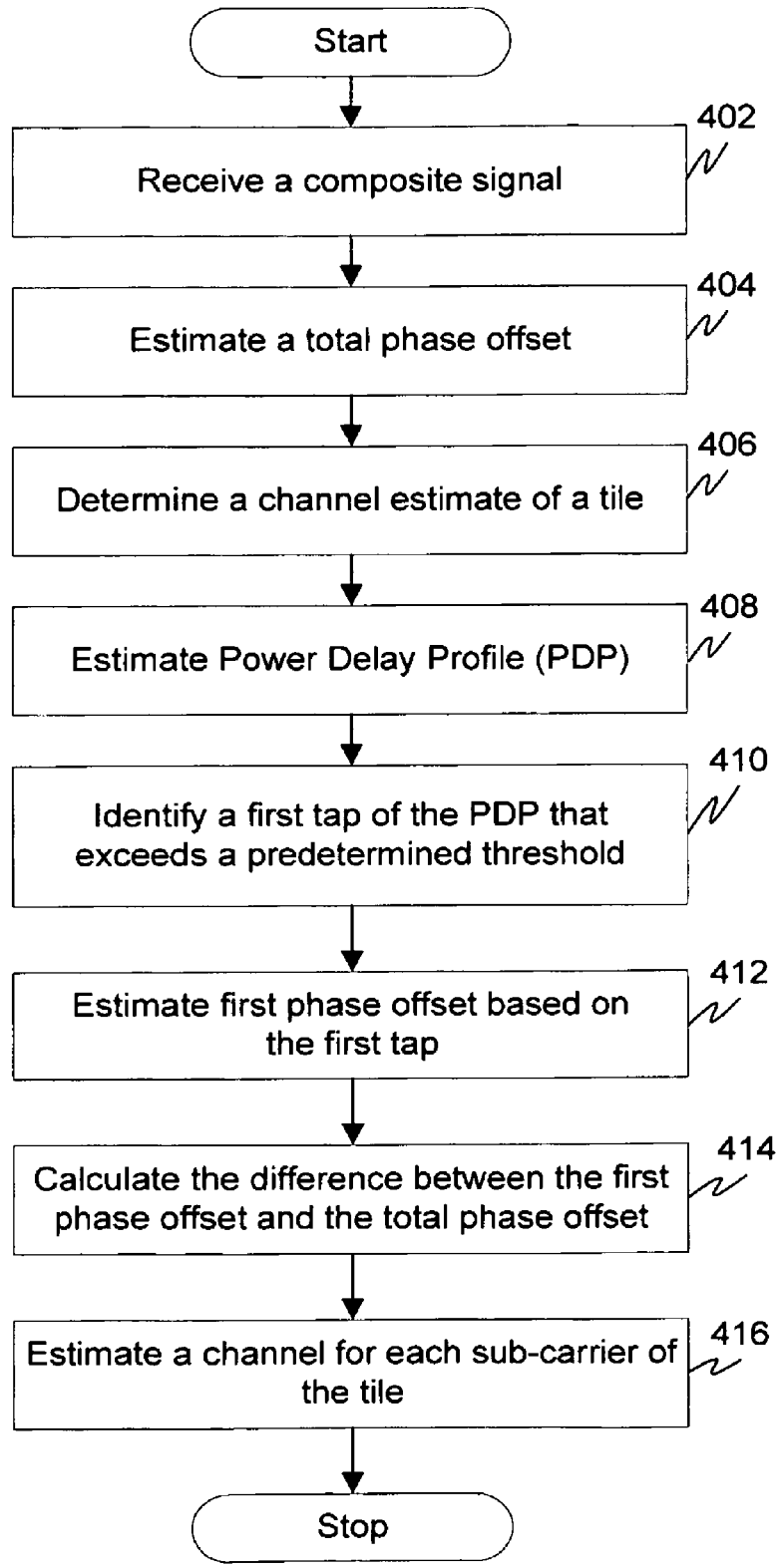
FIG. 4 is a flowchart for estimating a channel for each sub-carrier of a tile for a first MS and a second MS at a Base Transceiver Station (BTS) in a communication system, in accordance with an embodiment.

FIG. 4 is a flowchart for estimating a channel for each sub-carrier of a tile for first MS 102 and second MS 104 at BTS 106 in communication system 100, in accordance with an embodiment. At 402, a composite signal, which includes a first signal of first MS 102 transmitted from transmit antenna 110 and a second signal of second MS 104 transmitted from transmit antenna 112, is received through one or more receiver antennas. The composite signal includes one or more tiles. This has been already explained in conjunction with FIG. 3. Thereafter, at 404, a total phase offset of first MS 102 is estimated based on a complex conjugate product of pilot symbols of the plurality of first pilot sub-carriers. Similarly, a second MS total phase offset of second MS 104 is estimated based on a complex conjugate product of pilot symbols of the plurality of second pilot sub-carriers. This has been already explained in conjunction with FIG. 3.

Figure 6:
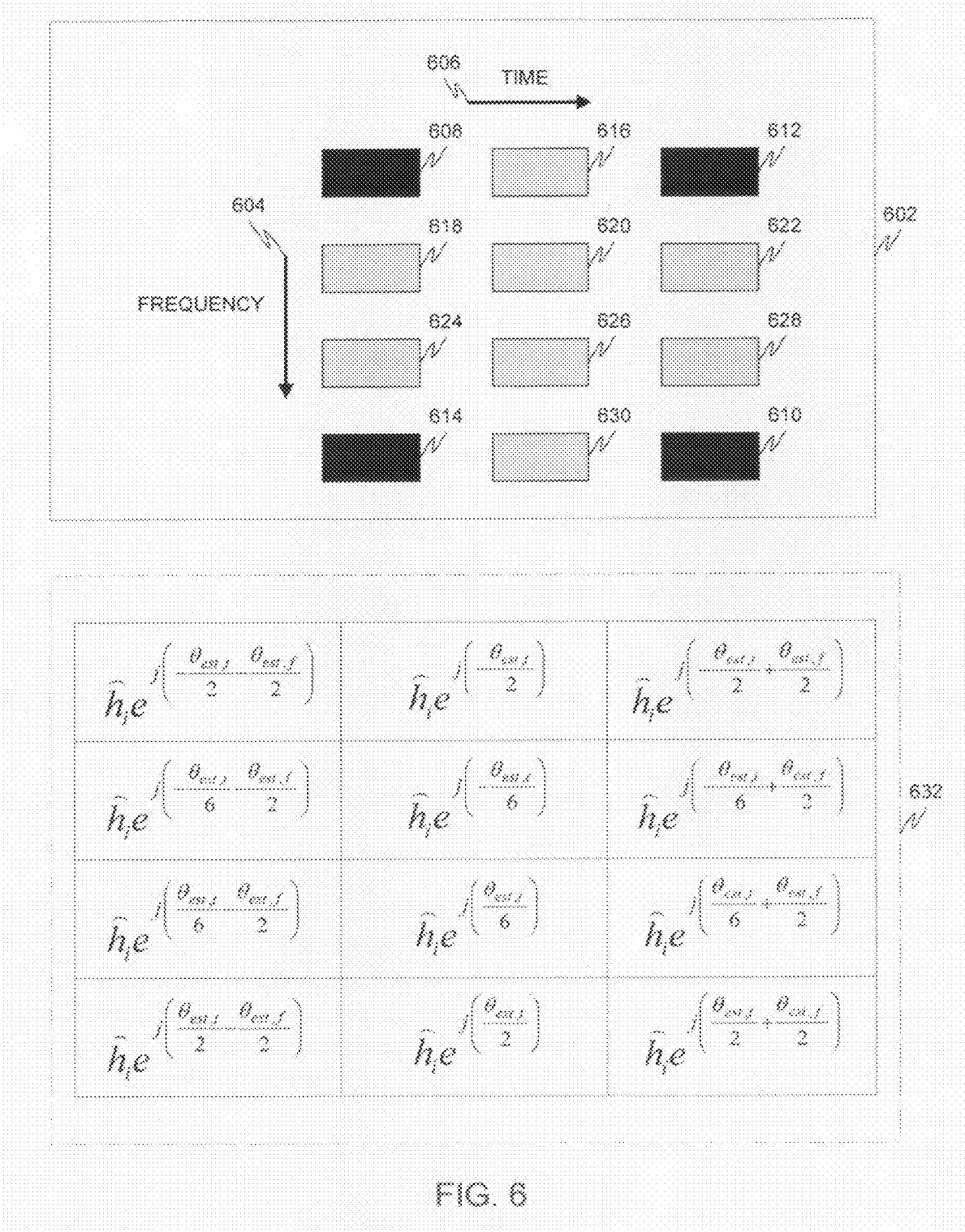
FIG. 6 shows the estimation of channel of a first MS and a second MS in a tile of a composite signal transmitted from the first MS and the second MS to BTS in a communication system, in accordance with an exemplary embodiment.

At 406, a channel estimate of the tile between first MS 102 and BTS 106 is determined based on the plurality of first pilot sub-carriers. Similarly, a channel estimate of the tile between second MS 104 and the BTS 106 is determined based on the plurality of second pilot sub-carriers. This is further explained in detail in conjunction with FIG. 6 given below. In an exemplary embodiment, the channel estimate of a tile between a MS and BTS 106 can be determined based on the weighted average of two pilot-sub-carriers of the MS in the tile using equation (5) given below:

$$\hat{h}_{i,p} = \frac{1}{2\sqrt{2}}\left[Y_{i,p}(k,l)\exp\left(j\frac{\theta_{est}}{2}\right) + Y_{i,p}(k+u,l+v)\exp\left(-j\frac{\theta_{est}}{2}\right)\right] \quad (5)$$

where, $\hat{h}_{i,p}$ is the channel estimate of the MS for the p-th tile and i-th BTS receiver antenna; and each of the two pilot sub-carriers are updated using the total phase offset determined for the MS.

In equation (5) given above, the factor "$\sqrt{2}$" is employed for de-boosting the two pilot sub-carriers corresponding to the MS in the tile, as the power of the two pilot sub-carriers in the tile are boosted by 3 dB relative to the data sub-carriers at the MS, when the signal is transmitted from the MS to BTS 106.

In another exemplary embodiment, channel estimate of a tile between a MS and BTS 106 can be determined simply based on the average of two pilot-sub-carriers of the MS in the tile using equation (6) given below:

$$\hat{h}_{i,p} = \frac{1}{2\sqrt{2}}[Y_{i,p}(k,l) + Y_{i,p}(k+u,l+v)] \quad (6)$$

Similar to equation (5), in equation (6) the factor "$\sqrt{2}$" is employed for de-boosting the two pilot sub-carriers corresponding to the MS in the tile.

Figure 5:
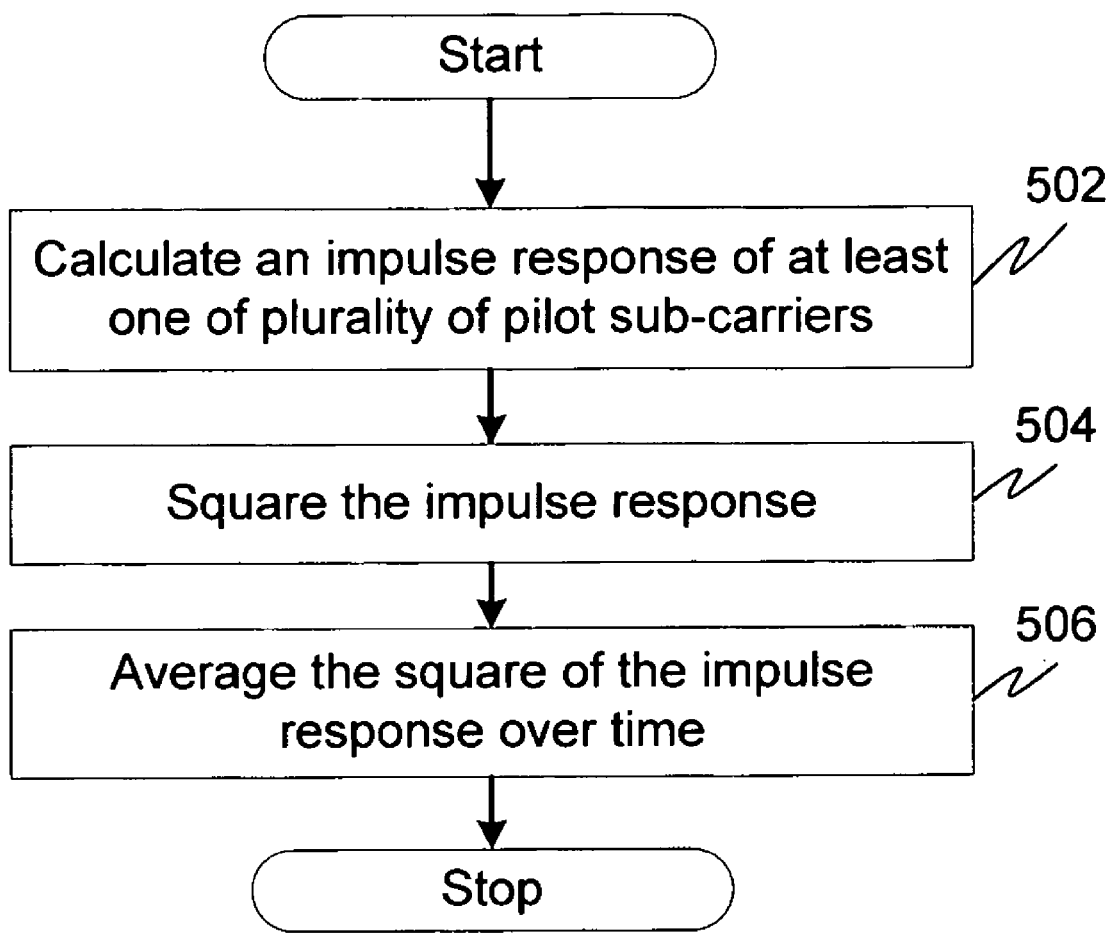
FIG. 5 is a flowchart for estimating a Power Delay Profile (PDP) of a plurality of first pilot sub-carriers for a first MS and a PDP of a plurality of second pilot sub-carriers for a second MS at a BTS in a communication system, in accordance with an embodiment.

At 408, a first Power Delay Profile (PDP) corresponding to first MS 102 is determined based on the impulse response calculated using one or more first pilot sub-carriers. Similarly, a second PDP corresponding to second MS 102 is computed based on the impulse response calculated using one or more second pilot sub-carriers. This is further explained in detail in conjunction with FIG. 5 given below. In the first PDP corresponding to first MS 102, a first tap that exceeds a predetermined threshold is identified to estimate a first phase offset of first MS 102, at 410. The predetermined threshold may be computed based on a dominant tap which has maximum energy in the PDP. Thereafter, a first tap that exceeds the predetermined threshold is identified for estimating the first offset corresponding to timing offset of a MS. It will be apparent to a person skilled in the art that the computation of the predetermined threshold is not limited to the above listed method.

At 412, the first phase offset corresponding to the timing offset is estimated based on the first tap. It would be apparent to the person skilled in the art that the second MS first phase offset can be estimated in a similar manner based on the PDP of one or more second pilot sub-carriers. In an exemplary embodiment, the timing offset of a MS is determined using equation (7) given below:

$$\theta_{est,t} = \hat{\theta}_t(k+3) - \hat{\theta}_t(k) = -2\pi \frac{3}{N} n_{first} \tag{7}$$

where
$\theta_{est,t}$ is the timing offset of the MS;
$\hat{\theta}_t(k+3)$ is the phase in the signal received at the (k+3)-th sub-carrier location due to timing offset;
$\hat{\theta}_t(k)$ is the phase in the signal received at the k-th sub-carrier location due to timing offset;
$n_{first}$ is the index of the first tap that exceeds the predetermined threshold
N is the size of the Fast Fourier Transformation (FFT) applied to the composite signal.

At 414, a second phase offset corresponding to the frequency offset of first MS 102 is estimated by calculating the difference between the first phase offset of first MS 102 and the total phase offset of first MS 102. This has been explained in conjunction with FIG. 3 given above. Similarly, a second MS second phase offset corresponding to the frequency offset of second MS 104 is estimated by calculating the difference between the second MS first phase offset and the second MS total phase offset.

Thereafter, at 416, a channel is estimated for each sub-carrier of the tile based on the channel estimate of the tile and a weighted sum of the first phase offset and the second phase offset. Similarly, a channel is estimated for each sub-carrier of the tile for second MS 104 based on the channel estimate of the tile and a weighted sum of the second MS first phase offset and the second MS second phase offset. For example, for first MS 102, a combined phase offset may be generated for each pilot sub-carrier and each data sub-carrier in the tile associated with first MS 102 by computing a weighted sum of the first phase offset and the second phase offset. Thereafter, the combined phase offset generated for each pilot sub-carrier and each data sub-carrier in the tile for first MS 102 is applied to the channel estimate determined for the tile for first MS 102 to estimate a channel for each sub-carrier of the tile. Similarly, for second MS 104, a combined phase offset may be generated for each pilot sub-carrier and each data sub-carriers in the tile associated with second MS 104 by computing a weighted sum of the second MS first phase offset and the second MS second phase offset. Thereafter, the combined phase offset generated for each pilot sub-carrier and each data sub-carrier in the tile for second MS 104 is applied to the channel estimate determined for the tile for second MS 104 to estimate a channel for each sub-carrier of the tile. This is further explained in detail in conjunction with FIG. 6 given below.

In an exemplary embodiment, the combined phase for a MS may be generated by using equation (8) given below:

$$\hat{h}_{i,p}(k,l) = \hat{h}_{i,p} e^{j(a(k,l)\theta_{est,t} + b(k,l)\theta_{est,f})} \tag{8}$$

where,
a and b are weights associated with the timing offset and the frequency offset for the MS respectively.

FIG. 5 is a flow chart for estimating a Power Delay Profile (PDP) of the plurality of first pilot sub-carriers of first MS 102 and a PDP of the plurality of second pilot sub-carriers of second MS 104 at BTS 106 in communication system 100, in accordance with an embodiment. At 502, an impulse response is calculated using one or more first pilot sub-carriers for each receiver antenna of BTS 106. Similarly, for second MS 104, an impulse response is calculated using one or more second pilot sub-carriers for each receiver antenna of BTS 106.

In an exemplary embodiment, a time domain channel impulse response $\hat{h}_i(n)$ of plurality of pilot sub-carriers is obtained by performing Inverse Fast Fourier Transform (IFFT) on frequency domain channel response $H_i(n)$ at receiver antenna 114 and receiver antenna 116 of BTS 106, where i denotes the antenna index.

At 504, the absolute value of the impulse response of the plurality of first pilot sub-carriers is squared to estimate the PDP of the plurality of first pilot sub-carriers at each receiver antenna of BTS 106. Similarly, the absolute value of the impulse response of the plurality of second pilot sub-carriers is squared to estimate the PDP of the plurality of second pilot sub-carriers at each receiver antenna of BTS 106.

In an exemplary embodiment, an absolute value of the impulse response is squared to estimate a PDP ($y_i(n)$), which is given by equation (9) given below:

$$y_i(n) = |\hat{h}_i(n)|^2 \tag{9}$$

Thereafter, the square of the absolute value of the impulse response is averaged over time at 506 to estimate the PDP. In yet another embodiment, the PDP of the plurality of first pilot sub-carriers is averaged over the number of receiver antennas in BTS 106. This may be represented using equation (10) given below:

$$y(n) = \frac{1}{N_r} \sum_i^{N_r} |\hat{h}_i(n)|^2 \tag{10}$$

FIG. 6 shows the estimation of a channel of each sub-carrier of first MS 102 and second MS 104 in a tile 602 of a composite signal transmitted from first MS 102 and second MS 104 to BTS 106 in communication system 100, in accordance with an exemplary embodiment. The composite signal includes a first signal transmitted from first MS 102 and a second signal transmitted from second MS 104. Tile 602 includes four consecutive sub-carriers along the frequency dimension indicated by 604 and three consecutive time symbols along the time dimension indicated by 606. A sub-carrier in tile 602 may be one of a pilot sub-carrier and a data sub-carrier. In tile 602, two first pilot sub-carriers of first MS 102 are positioned at 608, which corresponds to the first sub-carrier and the first time symbol in tile 602, and at 610, which corresponds to the fourth sub-carrier and the third time symbol in tile 602. The signal received at the pilot sub-carrier position 608, which is a pilot sub-carrier position of first MS 102, may be represented as Y (1, 1) and the signal received at the pilot sub-carrier position 610, which is another pilot sub-carrier position of first MS 102, is represented as Y (4, 3).

Additionally, in tile 602, two second pilot sub-carriers of second MS 104 are positioned at 612, which corresponds to the first sub-carrier and the third time symbol in tile 602, and at 614, which corresponds to the fourth sub-carrier and the first time symbol in tile 602. The signal received at the pilot sub-carrier position 612, which is a pilot sub-carrier position of second MS 104, may be represented as Y (1, 3) and the signal received at the pilot sub-carrier position 614, which is another pilot sub-carrier position of second MS 104, is represented as Y (4, 1). Further, a plurality of data sub-carriers of first MS 102 and second MS 104 are superimposed at positions 616, 618, 620, 622, 624, 626, 628, and 630 in tile 602.

Referring back to FIG. 3, for first MS 102, a complex conjugate product is computed using the received signal at position 608 and position 610, and the resulting complex conjugate product is summed over the plurality of tiles and over the receiver antenna 114 and receiver antenna 116 of BTS 106 using equation (11) given below:

$$\sum_{p=1}^{P}\sum_{i=1}^{2}[Y_{i,p}^{*}(1,1)Y_{i,p}(4,3)] \quad (11)$$

where
i denotes the antenna index;
p denotes the tile index.

Thereafter, the average of the resulting sum for first MS 102 is determined using equation (12) given below:

$$\frac{1}{2P}\sum_{p=1}^{P}\sum_{i=1}^{2}[Y_{i,p}^{*}(1,1)Y_{i,p}(4,3)] \quad (12)$$

The average of the complex conjugate products is used to determine the total phase offset that results due to the timing offset and the frequency offset in the signal between transmit antenna 110 of first MS 102 and each of receiver antenna 114 and receiver antenna 116 of BTS 106. The total phase offset can be determined by using equation (13) given below:

$$\theta_{est} = \arg\left\{\frac{1}{2P}\sum_{p=1}^{P}\sum_{i=1}^{2}[Y_{i,p}^{*}(1,1)Y_{i,p}(4,3)]\right\} \quad (13)$$

It will be apparent to a person skilled in the art that the normalization of the sum in equation (11) carried out using the number of receiver antennas at BTS 106 and the number of tiles over which the estimation of phase is performed may be ignored as only the phase of the sum of the plurality of conjugate products for the MS is needed.

Thereafter, the first phase offset corresponding to the timing offset of first MS 102 in tile 602 is determined based on the PDP determined using one or more first pilot sub-carriers using equation (14) given below:

$$\theta_{est,t} = \hat{\theta}_t(k+3) - \hat{\theta}_t(k) = -2\pi\frac{3}{N}n_{first} \quad (14)$$

where,
$\theta_{est,t}$ is the first phase offset corresponding to the timing offset for first MS 102 at receiver antenna 114 and receiver antenna 116 of BTS 106.
$\hat{\theta}_t(k+3)$ is the phase in the received signal at the (k+3)-th sub-carrier location due to timing offset;
$\hat{\theta}_t(k)$ is the phase in the received signal at the k-th sub-carrier location due to timing offset;
$n_{first}$ is the index of the first tap that exceeds a predetermined threshold, and
N is the size of the Fast Fourier Transformation (FFT) applied to the composite signal.

The second phase offset $\theta_{est,f}$ corresponding to the frequency offset of first MS 102 in tile 602 of the composite signal received at receiver antenna 114 and receiver antenna 116 of BTS 106 is determined using equation (15) given below:

$$\theta_{est,f} = \theta_{est} - \theta_{est,t} \quad (15)$$

Thereafter, the channel estimate of tile 602 for first MS 102 is determined using equation (16) given below:

$$\hat{h}_{i,p} = \frac{1}{2\sqrt{2}}\left[Y_{i,p}(1,1)\exp\left(j\frac{\theta_{est}}{2}\right) + Y_{i,p}(4,3)\exp\left(-j\frac{\theta_{est}}{2}\right)\right] \quad (16)$$

After computing the channel estimate, combined phase offset is generated for each pilot sub-carrier and each data sub-carrier in tile 602 for first MS 102. The combined phase offset is generated by weighted sum of the first phase offset and the second phase offset along each pilot sub-carrier and each data sub-carrier in tile 602 for first MS 102 and is represented by equation (17):

Combined phase offset=$[a(k,l)\theta_{est,t} + b(k,l)\theta_{est,f}]$ (17)

Weights a and b are assigned to the first phase offset and the second phase offset based on the position of the sub-carrier in tile 602 for first MS 102.

Thereafter, the combined phase offset generated for each pilot sub-carrier and each data sub-carrier in tile 602 for first MS 102 is applied to the channel estimate determined using the equation (16). In this exemplary embodiment, a phase modified channel estimate for each first pilot sub-carrier and each data sub-carrier in tile 602 for first MS 102 is illustrated by block 632.

Figure 7:
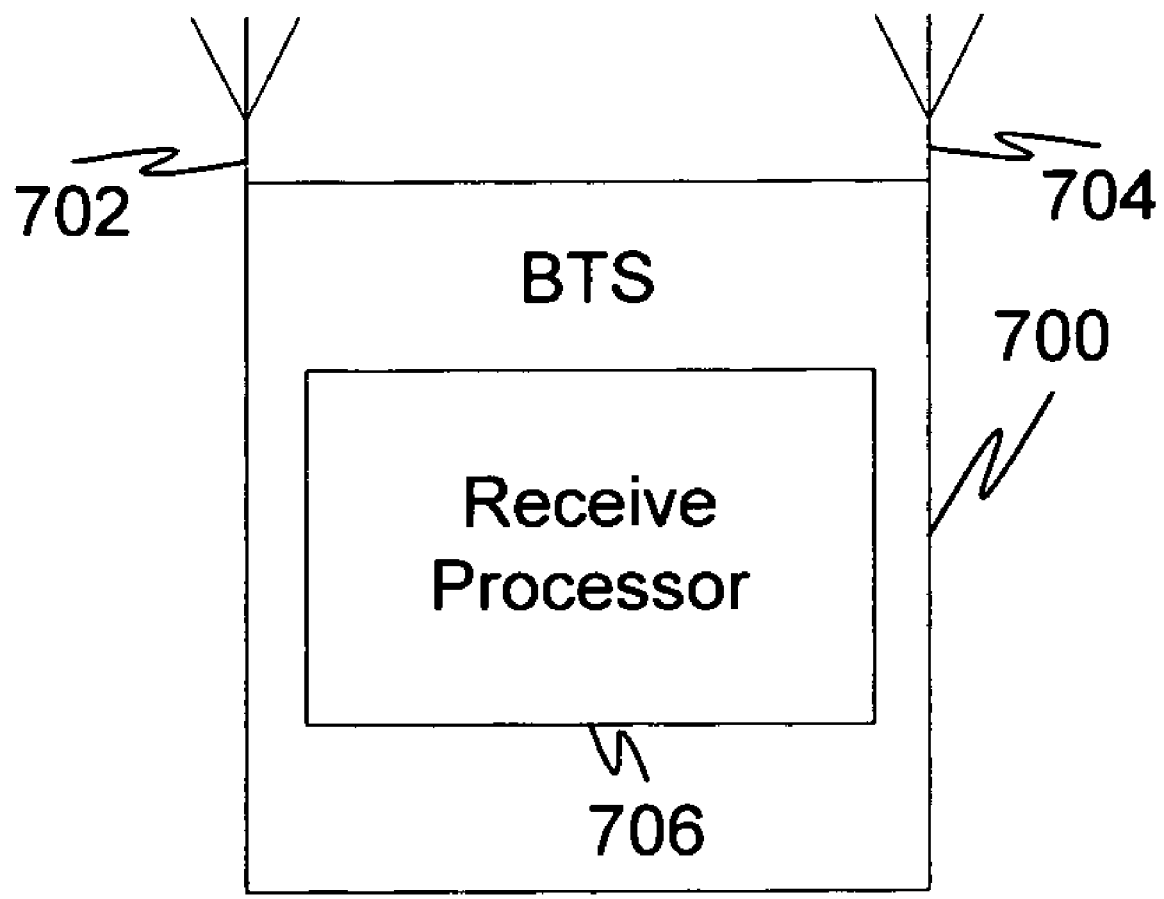
FIG. 7 is a block diagram of a BTS for estimating frequency offset and timing offset of a first MS and a second MS, in accordance with an embodiment.

FIG. 7 is a block diagram of a Base Transceiver Station (BTS) 700 for estimating frequency offset and timing offset of first MS 102 and second MS 104, in accordance with an embodiment. First MS 102 and second MS 104 may communicate with BTS 700. The communication may be a collaborative communication. A transmit antenna 110 of first MS 102 transmits a first signal to BTS 700. A transmit antenna 112 of second MS 104 transmits a second signal to BTS 700. The signals transmitted from first MS 102 and second MS 104 may be compliant with IEEE 108.16e Collaborative Spatial Multiplexing (CSM). A composite signal, which includes the first signal and the second signal, is received by one or more receiver antennas (for example, a receiver antenna 702 and a receiver antenna 704) of BTS 700. The composite signal includes one or more tiles. Each tile includes a plurality of data sub-carriers. The plurality of data sub-carriers correspond to first MS 102 and second MS 104. Data sub-carriers related to each of first MS 102 and second MS 104 may be superimposed in the tile. Each tile further includes a plurality of first pilot sub-carriers for first MS 102 and a plurality of second pilot sub-carriers for second MS 104. This has been explained in conjunction with FIG. 2 given above.

Processor 706 computes a sum of complex conjugate products using the signal received at the pilot sub-carrier locations of the plurality of first pilot sub-carriers of the composite signal. Thereafter, processor 706 estimates a total phase offset of first MS 102 based on the resulting sum. In an embodiment, processor 706 determines a sum of the complex conjugate products of the pilot symbols of the plurality of first pilot sub-carriers over the plurality of tiles. In addition, the processor 706 may determine a sum of the complex conjugate products of the pilot symbols of the plurality of first pilot sub-carriers over receiver antennas that receive the composite signal. A total phase offset of first MS 102 can be estimated based on the sum of complex conjugate products of the pilot symbols of the plurality of first pilot sub-carriers. Similarly, processor 706 estimates a second MS total phase offset of second MS 104 based on complex conjugate products of pilot symbols of the plurality of second pilot sub-carriers.

Thereafter, processor 706 determines a channel estimate of tile 602 between first MS 102 and BTS 700 based on the plurality of first pilot sub-carriers. Similarly, a channel estimate of the tile 602 between second MS 104 and BTS 700 is determined based on the plurality of second pilot sub-carriers. Processor 706 calculates an impulse response of one or more first pilot sub-carriers and determines a square of the absolute value of the impulse response to estimate a Power Delay Profile (PDP). The PDP may be averaged over receive antenna 702 and receive antenna 704 of BTS 700 to determine an average PDP. A first phase offset corresponding the timing offset of first MS 102 is estimated based on the average PDP. In an embodiment, the first phase offset corresponding to the timing offset of first MS 102 is estimated based on a first tap of the average PDP, which exceeds a predetermined threshold. This has been explained in detail in conjunction with FIG. 4 given above. Similarly, processor 706 estimates a second MS first phase offset corresponding to the timing offset of second MS 104 based on an average PDP determined using one or more second pilot sub-carriers.

After estimating the timing offset, processor 706 estimates a second phase offset corresponding to the frequency offset of first MS 102 based on the total phase offset and the first phase offset. In an embodiment, processor 706 calculates the difference between the first phase offset and the total phase offset to estimate a second phase offset corresponding to the frequency offset of first MS 102. In a similar way, processor 706 estimates a second MS phase offset corresponding to the frequency offset of second MS 104 based on the second MS total phase offset and the second MS first phase offset.

Thereafter, processor 706 estimates a channel for each sub-carrier of a tile based on the channel estimate of the tile and weighted sum of the first phase offset and second phase offset. This has been explained in detail in conjunction with FIG. 4 and FIG. 6 given above. In a similar way, processor 706 estimates a channel for each sub-carrier of a tile based on the channel estimate of the tile and weighted sum of the second MS first phase offset and second MS second phase offset.

Various embodiments of the invention provide method and apparatus for estimating frequency offset and timing offset of a MS in a communication system. The method described above facilitates accurate estimation of channel of one or more MSs involved in a collaborative communication with a BTS, when a signal transmitted from one or more MSs is impaired due to one or more of a timing offset and a frequency offset.

What is claimed is:

1. A method of estimating frequency offset and timing offset of a first mobile station (MS) comprising:
    receiving a composite signal comprising a first signal of the first MS and a second signal of a second MS, the composite signal comprising at least one tile, a tile comprising a plurality of data sub-carriers, a plurality of first pilot sub-carriers, and a plurality of second pilot sub-carriers;
    estimating a total phase offset of the first MS based on a complex conjugate product of pilot symbols of the plurality of first pilot sub-carriers;
    estimating a first phase offset corresponding to the timing offset of the first MS based on a power delay profile (PDP) of at least one of the plurality of first pilot sub-carriers; and
    estimating a second phase offset corresponding to the frequency offset of the first MS based on the total phase offset and the first phase offset.

2. The method of claim 1, further comprising estimating the PDP, comprising:
    calculating an impulse response using at least one of the plurality of first pilot sub-carriers; and
    squaring the absolute value of the impulse response.

3. The method of claim 2, further comprising averaging a square of the absolute value of the impulse response over time.

4. The method of claim 2, wherein the PDP further comprises an average of PDPs across multiple receiver antennas.

5. The method of claim 1, wherein estimating the first phase offset corresponding to the timing offset of the first MS based on the PDP comprises identifying a first tap of the PDP that exceeds a predetermined threshold.

6. The method of claim 1, wherein estimating the total phase offset comprises summing complex conjugate products of pilot symbols of the plurality of first pilot sub-carriers over a plurality of tiles.

7. The method of claim 1, wherein estimating the total phase offset comprises summing complex conjugate products of pilot symbols of the plurality of first pilot sub-carriers over multiple receiver antennas.

8. The method of claim 1, further comprising estimating frequency offset and timing offset of the second MS, comprising:
    estimating a second MS total phase offset of the second MS based on a complex conjugate product of pilot symbols of the plurality of second pilot sub-carriers;
    estimating a second MS first phase offset corresponding to the timing offset of the second MS based on a power delay profile (PDP) of at least one of the plurality of second pilot sub-carriers;
    estimating a second MS second phase offset corresponding to the frequency offset of the second MS based on the second MS total phase offset and the second MS first phase offset.

9. The method of claim 1, wherein estimating the second phase offset corresponding to the frequency offset of the first MS based on the total phase offset and the first phase offset comprises:
    calculating the difference between the first phase offset and the total phase offset.

10. The method of claim 1, further comprising:
   determining a channel estimate of the tile between the first MS and a base transceiver station (BTS) based on the first pilot sub-carriers.

11. The method of claim 10, further comprising estimating a channel for each sub-carrier of the tile based on the channel estimate of the tile and on a weighted sum of the first phase offset and the second phase offset.

12. The method of claim 8, further comprising:
   determining a channel estimate of the tile between the second MS and a base transceiver station (BTS) based on the second pilot sub-carriers.

13. The method of claim 12, further comprising estimating a channel for each sub-carrier of the tile based on the channel estimate of the tile and on a weighted sum of the second MS first phase offset and the second MS second phase offset.

14. A Base Transceiver Station (BTS) for estimating timing offset and frequency offset of a first Mobile Station (MS), the BTS comprises:
   at least one receiver antenna for receiving a composite signal comprising a first signal of a first MS and a second signal of a second MS, the composite signal comprising at least one tile, a tile comprising a plurality of data sub-carriers, a plurality of first pilot sub-carriers, and a plurality of second pilot sub-carriers; and
   a processor configured to:
      estimate a total phase offset of the first MS based on a complex conjugate product of pilot symbols of the plurality of first pilot sub-carriers;
      estimate a first phase offset corresponding to the timing offset of the first MS based on a power delay profile (PDP) of at least one of the plurality of first pilot sub-carriers; and
      estimate a second phase offset corresponding to the frequency offset of the first MS based on the total phase offset and the first phase offset.

15. The BTS of claim 14, wherein the processor is further configured to estimate the PDP by calculating an impulse response using at least one of the plurality of first pilot sub-carriers and squaring the absolute value of the impulse response.

16. The BTS of claim 14, wherein the first phase offset corresponding to the timing offset is estimated by identifying a first tap of the PDP that exceeds a predetermined threshold.

17. The BTS of claim 14, wherein the total phase offset is estimated by summing complex conjugate products of pilot symbols of the plurality of first pilot sub-carriers over a plurality of tiles.

18. The BTS of claim 14, wherein the total phase offset is estimated by summing complex conjugate products of pilot symbols of the plurality of first pilot sub-carriers over multiple receiver antennas.

19. The BTS of claim 14, wherein the second phase offset corresponding to the frequency offset of the first MS is estimated by calculating the difference between the first phase offset and the total phase offset.

20. The BTS of claim 14, wherein the processor is further configured to determine a channel estimate of the tile between the first MS and the BTS based on the first pilot sub-carriers.

21. The BTS of claim 20, wherein the processor is further configured to determine a channel for each sub carrier of the tile based on the channel estimate of the tile and on a weighted sum of the first phase offset and the second phase offset.

22. The BTS of claim 14, wherein the processor is further configured to:
   estimate a second MS total phase offset of the second MS based on a complex conjugate product of pilot symbols of the plurality of second pilot sub-carriers;
   estimate a second MS first phase offset corresponding to the timing offset of the second MS based on a Power Delay Profile (PDP) of at least one of the plurality of second pilot sub-carriers; and
   estimate a second MS second phase offset corresponding to the frequency offset of the second MS based on the second MS total phase offset and the second MS first phase offset.

23. The BTS of claim 22, wherein a channel estimate of the tile between the second MS and the BTS is determined based on the second pilot sub-carriers.

24. The BTS of claim 22, wherein a channel for each sub-carrier of the tile is estimated based on the channel estimate of the tile and on a weighted sum of the second MS first phase offset and the second MS second phase offset.

* * * * *